G. BOUTON.
VAT FOR ACCUMULATORS, BATTERIES, OR THE LIKE.
APPLICATION FILED DEC. 10, 1917.
1,266,911. Patented May 21, 1918.
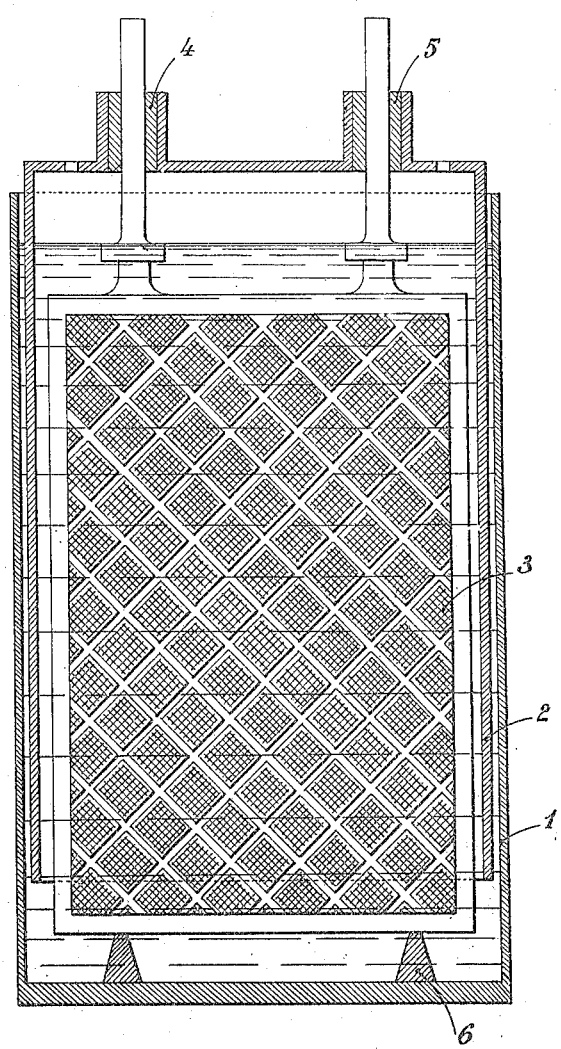

UNITED STATES PATENT OFFICE.

GEORGES BOUTON, OF PARIS, FRANCE, ASSIGNOR TO ETABLISSEMENTS DE DION BOUTON, SOCIETE ANONYME, OF PUTEAUX, FRANCE, A CORPORATION OF FRANCE.

VAT FOR ACCUMULATORS, BATTERIES, OR THE LIKE.

1,266,911.     Specification of Letters Patent.     Patented May 21, 1918.

Application filed December 10, 1917. Serial No. 206,515.

*To all whom it may concern:*

Be it known that I, GEORGES BOUTON, engineer, of 8 Avenue des Ternes at Paris, Department of the Seine, France, citizen of the French Republic, have invented certain new and useful Improvements in or Relating to Vats for Accumulators, Batteries, or the like; and I do hereby declare the following to be a full, clear, and exact description of the invention, such as will enable others skilled in the art to which it appertains to make and use the same.

This invention relates to improvements in vats for accumulators or batteries and it has particular reference to an arrangement which simplifies the fitting and facilitates the cleaning of the various parts.

The invention comprises a cover with depending sides fitting with clearance in the vat of the accumulator. The upper part of the said cover is provided with holes for the passage of the electrical connections of the plates, and for the escape of the gases; and the bottom has removable or fixed blocks to space the plates from the bottom of the vat so as to leave space for the material that may fall out of the plate.

Thus the plates can be mounted on the cover and easily fitted. By using suitable joints and, if necessary, closing the joints with sealing material, a completely tight joint for the terminals can be obtained.

The accompanying drawing shows by way of example a construction according to the invention.

The accumulator element comprises a vat 1 into which fits, with clearance, the whole of the cover 2 and plates 3 the latter being fitted into the cover in any suitable manner. The top of the cover 2 is provided with holes 4 and 5 through which pass the electrical connections of the plates. The blocks 6 placed at the bottom of the cover support the whole of the plates and cover. A perfectly tight joint of the terminals can be obtained by pouring sealing material into the joint. This construction enables the dismantling and cleaning of an element to be easily effected.

Obviously the invention is equally applicable to vases containing batteries, and to vats used for electro-plating.

I claim:

A storage battery comprising a vat, a cover therefor, and plates mounted on the cover and located within the vat, a cover having depending sides extending, with clearance, into the vat and forming a housing for the plates.

In testimony whereof I affix my signature, in presence of two witnesses.

GEORGES BOUTON.

Witnesses:
   CHAS. P. PRESSLY,
   ALEXANDRE BERTHOLLE.